United States Patent
Pais et al.

(10) Patent No.: US 10,026,547 B2
(45) Date of Patent: Jul. 17, 2018

(54) COIL AND METHOD FOR INCREASING THE DEGREE OF AN ELECTROMAGNETIC COUPLING

(71) Applicant: Motorola Mobility LLC, Chicago, IL (US)

(72) Inventors: Martin R Pais, North Barrington, IL (US); David A Winkler, Aurora, IL (US)

(73) Assignee: Motorola Mobility LLC, Chicago, IL (US)

( * ) Notice: Subject to any disclaimer, the term of this patent is extended or adjusted under 35 U.S.C. 154(b) by 122 days.

(21) Appl. No.: 15/083,824

(22) Filed: Mar. 29, 2016

(65) Prior Publication Data
US 2017/0287630 A1    Oct. 5, 2017

(51) Int. Cl.
| | |
|---|---|
| H02J 7/00 | (2006.01) |
| H01F 38/14 | (2006.01) |
| H01F 27/28 | (2006.01) |
| H02J 7/02 | (2016.01) |
| H01F 29/10 | (2006.01) |
| H02J 50/10 | (2016.01) |
| H04W 4/00 | (2018.01) |
| H04W 4/80 | (2018.01) |
| H04W 88/02 | (2009.01) |

(52) U.S. Cl.
CPC ......... *H01F 38/14* (2013.01); *H01F 27/2804* (2013.01); *H01F 29/10* (2013.01); *H02J 7/025* (2013.01); *H02J 50/10* (2016.02); *H04W 4/008* (2013.01); *H04W 4/80* (2018.02); *H01F 2038/143* (2013.01); *H04W 88/02* (2013.01)

(58) Field of Classification Search
CPC .. H02J 7/025; H02J 50/12; H02J 5/005; H02J 50/10; H02J 50/00; H01F 38/14; H01F 2027/2809; H01F 27/2871; H01F 27/28; H01Q 7/00; H01Q 1/243; H01Q 9/14
USPC .......................................................... 320/108
See application file for complete search history.

(56) References Cited

U.S. PATENT DOCUMENTS

| | | | | |
|---|---|---|---|---|
| 4,825,184 A * | 4/1989 | Bloch | ..................... | H01T 21/04 336/20 |
| RE42,087 E * | 2/2011 | Mertel | ..................... | H01Q 1/10 343/814 |
| 9,287,607 B2 * | 3/2016 | Efe | ......................... | H01F 38/14 |
| 2014/0375262 A1 * | 12/2014 | Yamaguchi | ............. | H02J 7/025 320/108 |

* cited by examiner

*Primary Examiner* — Nghia Doan
(74) *Attorney, Agent, or Firm* — Watson Intellectual Property Group

(57) ABSTRACT

The present application provides a coil for facilitating an electromagnetic coupling and method for increasing the degree of an electromagnetic coupling. The coil for facilitating an electromagnetic coupling includes one or more loops formed from a material through which an electric current can flow. At least one of the one or more loops is adjustable, including at least one of a size and a shape of the at least one of the one or more loops of the coil being selectively adjustable.

16 Claims, 9 Drawing Sheets

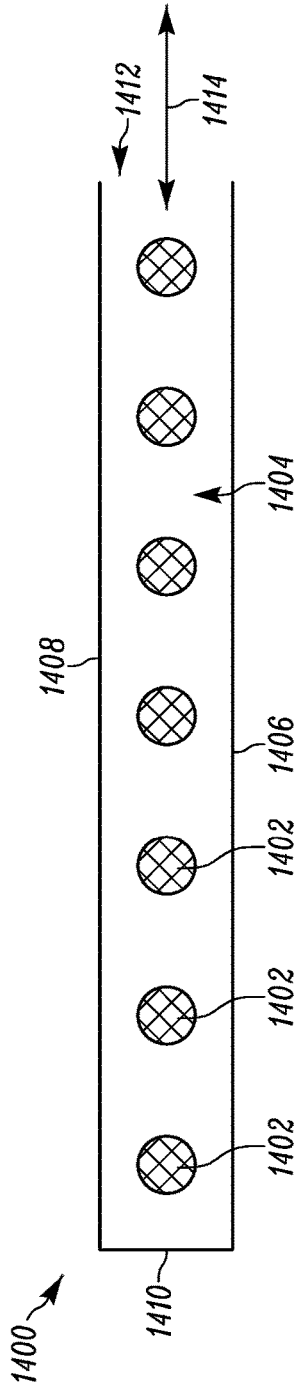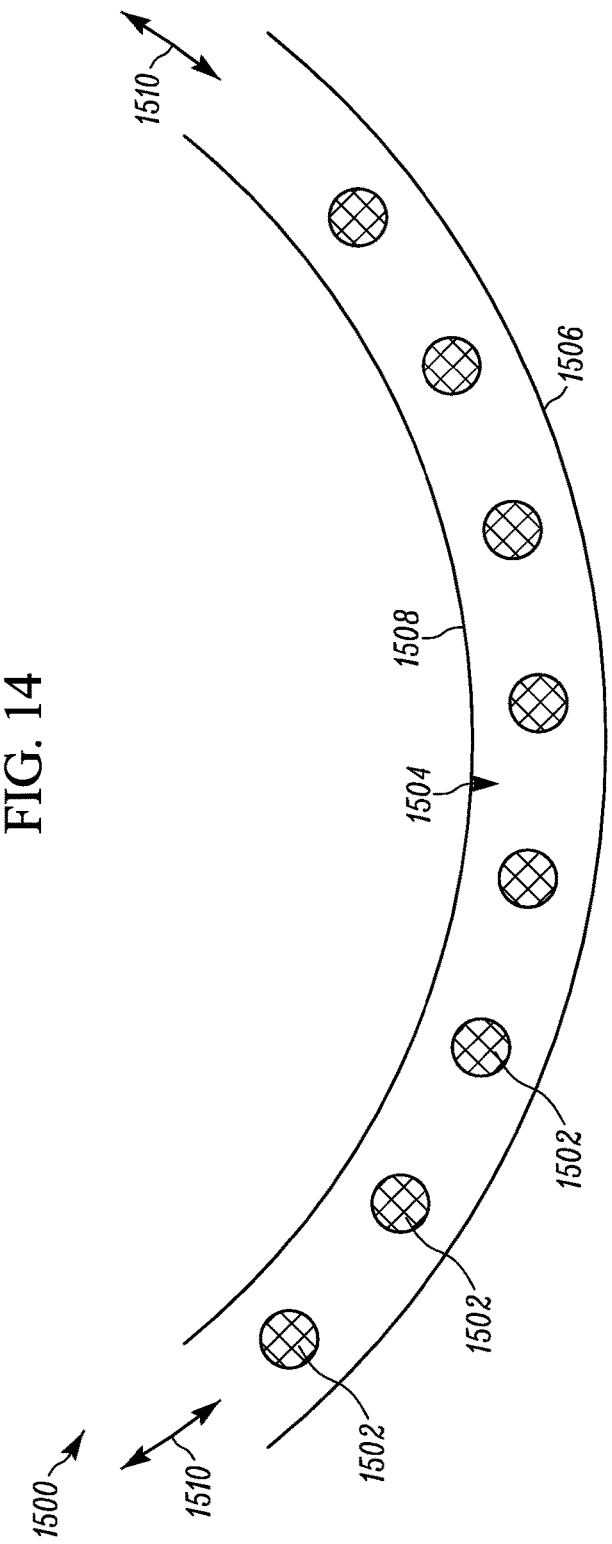

COIL AND METHOD FOR INCREASING THE DEGREE OF AN ELECTROMAGNETIC COUPLING

FIELD OF THE APPLICATION

The present disclosure relates generally to coils for use in facilitating an electromagnetic coupling with at least another coil, and more particularly, to coils having one or more loops, which are selectively dimensionally adjustable to enable a higher degree of electromagnetic coupling with the other coil(s).

BACKGROUND

Electromagnetic or inductive coupling includes the near field wireless transmission of electrical energy between two conductors, such as magnetically coupled coils. The amount of electromagnetic/inductive coupling between the two conductors is measured by their mutual inductance, where the coupling between the two conductors can be increased by winding them into coils and placing them relatively proximate to one another in an orientation in which a magnetic field induced in one of the coils intersects and/or passes through the other one of the two coils. The transmission of electrical energy via electromagnetic/inductive coupling has been used to exchange information as well as to transfer energy between two objects. Transferring energy via electromagnetic/inductive coupling is also sometimes referred to as wireless charging, and is a feature that is being increasingly supported in portable electronic devices.

While the technology associated with wireless charging has not yet been widely adopted, we are already starting to see the development of multiple forms of the technology, which each have varying interface requirements. However, generally, the various technologies involve the arrangement of the device to be charged with a charging station, such that an electromagnetic/inductive coupling interaction is created between a coil associated with the device to be charged and a coil associated with the charging station. The electromagnetic/inductive coupling interaction generally involves an electromagnetic field produced by a current in the coil associated with the charging station which is intended to induce a voltage in the coil associated with the device to be charged. The induced current is in theory of a sufficient magnitude, such that it can be collected and used to power the device and/or used to recharge a power storage element such as a battery, which can then be later used to power the device. However, the degree and/or efficiency with which power can be supplied through the electromagnetic/inductive coupling is often dependent upon the proximity, orientation and arrangement of the two sets of coils and/or conductors, which are respectively associated with the charging device and the device to be charged. However, the charging device could be expected to interact with multiple different types of devices, where each device might have a different arrangement with its own unique coil configuration including an associated size and shape. In some instances, a charging device might be expected to simultaneously support the supply of power to multiple devices.

The present inventors have recognized that, because the charging device and/or device to be charged may be expected to interact in multiple different types of charging environments, where the charging device and/or device(s) to be charged may have varying configurations, a charging device and/or a device to be charged that has a coil configuration that can be more readily adjusted and adapted to different types of charging environments may be beneficial.

SUMMARY

The present application provides a coil for facilitating an electromagnetic coupling. The coil for facilitating an electromagnetic coupling includes one or more loops formed from a material through which an electric current can flow. At least one of the one or more loops is adjustable, including at least one of a size and a shape of the at least one of the one or more loops of the coil being selectively adjustable.

In at least one embodiment, the coil further includes a mechanical adjustor for applying a force to the coil at at least one point along the length of the coil.

In at least a further embodiment, the coil is incorporated as part of a wireless charging device.

The present application further provides a method for increasing the degree of an electromagnetic coupling, where the electromagnetic coupling includes a coupling between at least a pair of distinct coils where at least one of the electromagnetically coupled coils has at least one loop adjustable in at least one of size and shape. The method includes determining an efficiency of the coil having the at least one adjustable loop in transferring power as part of an electromagnetic coupling by comparing a measured amount of power transmitted in a first coil of the at least a pair of distinct coils with a measured amount of power received in a second coil of the at least a pair of distinct coils. At least one of size and shape of the at least one adjustable loop of the coil is then adjusted. A new efficiency of the coil after the at least one of size and shape of the at least one adjustable loop has been adjusted is then determined. The new efficiency is then compared with the efficiency determined immediately prior to the most recent adjustment. The adjustment in the at least one of size and shape of the at least one adjustable loop is retained, when the new efficiency is determined to be an improvement relative to the efficiency determined immediately prior to the most recent adjustment. Otherwise, the size and shape of the at least one adjustable loop of the coil is reverted back to the size and shape prior to adjustment, when the new efficiency is determined to not be an improvement relative to the efficiency determined immediately prior to the most recent adjustment.

These and other features, and advantages of the present disclosure are evident from the following description of one or more preferred embodiments, with reference to the accompanying drawings.

BRIEF DESCRIPTION OF THE DRAWINGS

FIG. 14 is a partial sectional side view of a plurality of loops of a coil positioned within a void;

FIG. 15 is a partial sectional side view of a plurality of loops of a coil positioned within a curved void;

DETAILED DESCRIPTION OF THE PREFERRED EMBODIMENT(S)

Figure 2:
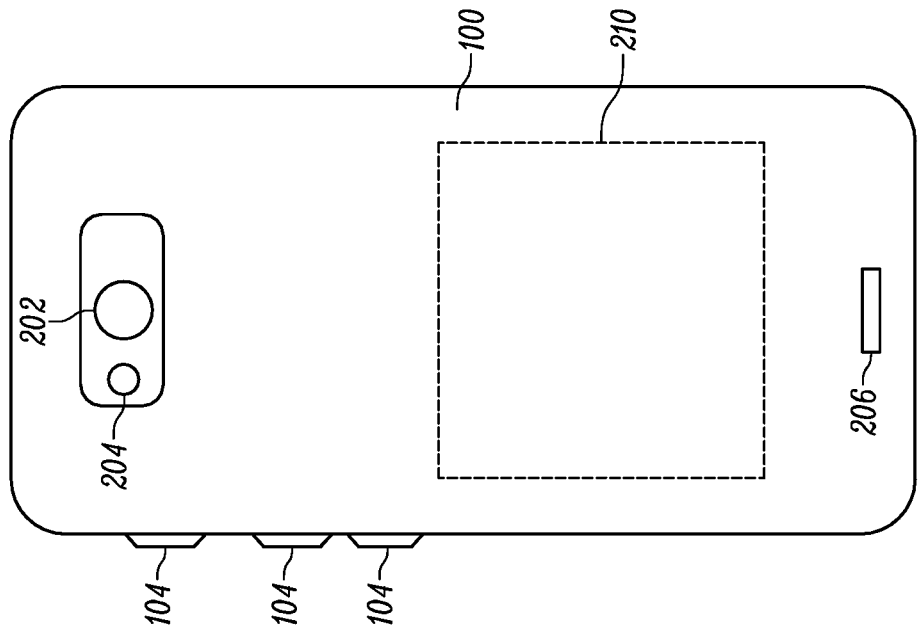
FIG. 2 is a back view of an exemplary portable electronic device.

While the present invention is susceptible of embodiment in various forms, there is shown in the drawings and will hereinafter be described presently preferred embodiments with the understanding that the present disclosure is to be considered an exemplification and is not intended to limit the invention to the specific embodiments illustrated. One skilled in the art will hopefully appreciate that the elements in the drawings are illustrated for simplicity and clarity and have not necessarily been drawn to scale. For example, the dimensions of some of the elements in the drawings may be exaggerated relative to other elements with the intent to help improve understanding of the aspects of the embodiments being illustrated and described.

Figure 1:
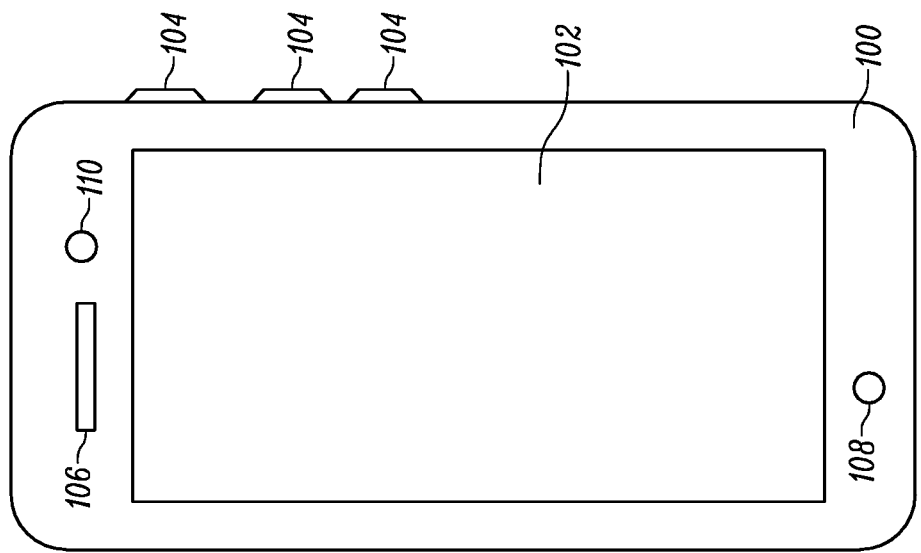
FIG. 1 is a front view of an exemplary portable electronic device.

FIG. 1 illustrates a front view of an exemplary portable electronic device 100. While in the illustrated embodiment, the type of portable electronic device shown is a radio frequency cellular telephone, which incorporates electromagnetic coupling, such as wireless charging capabilities and/or near field communications, other types of devices that incorporate electromagnetic coupling are also relevant to the present application. In other words, the present application is generally applicable to portable electronic devices beyond the type being specifically shown. A couple of additional examples of suitable portable electronic devices that may additionally be relevant to the present application in the incorporation and management of multiple types of wireless charging and near field communications in a portable electronic device can include a tablet, a cordless telephone, a selective call receiver, an audio player, a gaming device, a personal digital assistant, a wireless headset, as well as any other form of portable electronic device that one might at least sometimes carry around on one's person for which it might be desirable to wirelessly charge and/or engage in one or more forms of near field communications.

In the illustrated embodiment, the radio frequency cellular telephone includes a display 102 which covers a large portion of the front facing. In at least some instances, the display can incorporate a touch sensitive matrix, that facilitates detection of one or more user inputs relative to at least some portions of the display, including interaction with visual elements being presented to the user via the display 102. In some instances, the visual element could be an object with which the user can interact. In other instances, the visual element can form part of a visual representation of a keyboard including one or more virtual keys and/or one or more buttons with which the user can interact and/or select for actuation. In addition to one or more virtual user actuatable buttons or keys, the device 100 can include one or more physical user actuatable buttons 104. In the particular embodiment illustrated, the device has three such buttons located along the right side of the device.

The exemplary portable electronic device, illustrated in FIG. 1, additionally includes a speaker 106 and a microphone 108 in support of voice communications. The speaker 106 may additionally support the reproduction of an audio signal, which could be a stand-alone signal, such as for use in the playing of music, or can be part of a multimedia presentation, such as for use in the playing of a movie, which might have at least an audio as well as a visual component. The speaker 106 may also include the capability to also produce a vibratory effect. However, in some instances, the purposeful production of vibrational effects may be associated with a separate element, not shown, which is internal to the device. Generally, the speaker 106 is located toward the top of the device, which corresponds to an orientation consistent with the respective portion of the device facing in an upward direction during usage in support of a voice communication. In such an instance, the speaker 106 might be intended to align with the ear of the user, and the microphone 108 might be intended to align with the mouth of the user. Also located near the top of the device, in the illustrated embodiment, is a front facing camera 110.

FIG. 2 illustrates a back view of the exemplary portable electronic device 100, illustrated in FIG. 1. In the back view of the exemplary portable electronic device, the three physical user actuatable buttons 104, which are visible in the front view, can similarly be seen. The exemplary hand held electronic device 100 additionally includes a back side facing camera 202 with a flash 204, as well as a serial bus port 206, which is generally adapted for receiving a cable connection, and which can be used to receive data and/or power signals. Still further, the illustrated embodiment includes an area 210 proximate the back side surface within which one or more coils, such as one or more loop antennas, can be located. The one or more coils could be adapted for supporting such functions as wireless charging and/or near field communications. Additionally, the one or more coils can be located internal to the device, often just below the back side surface of the device 100.

Figure 3:
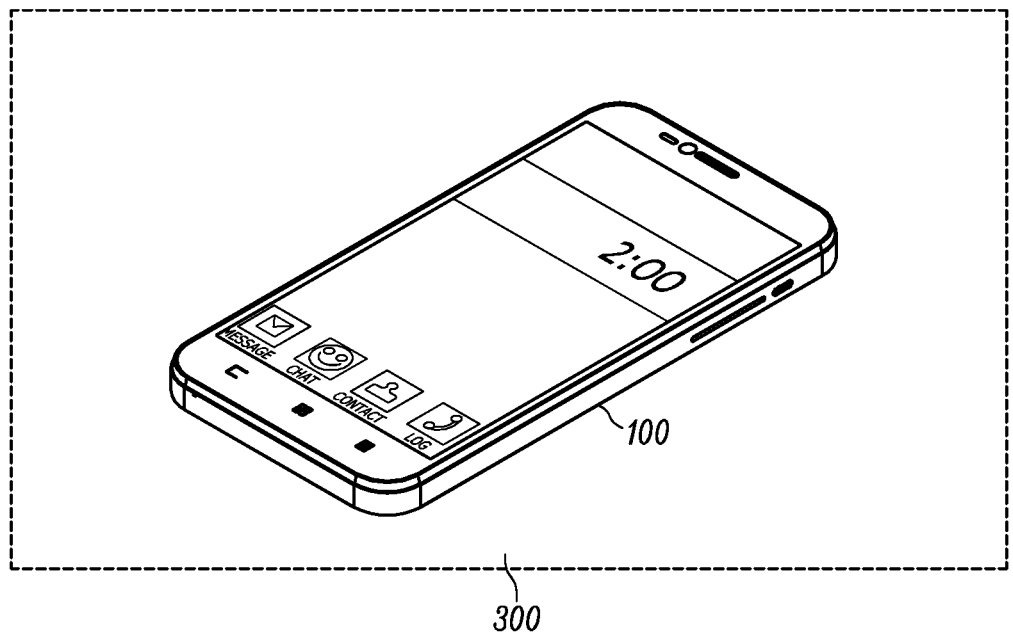
FIG. 3 is a partial perspective view of an exemplary portable electronic device in contact with a substantially flat surface.

FIG. 3 illustrates a partial perspective view of an exemplary portable electronic device 100 in contact with a substantially flat surface 300. In at least some instances, the substantially flat surface 300 could be part of a wireless charging device, which similar to the exemplary portable electronic device 100 can have one or more coils, which are present just below the surface. The one or more coils associated with the flat surface 300 of a wireless charging device are intended to interact with the one or more coils of the portable electronic device 100, so as to allow for an electromagnetic coupling between the two sets of one or more coils.

Figure 4:
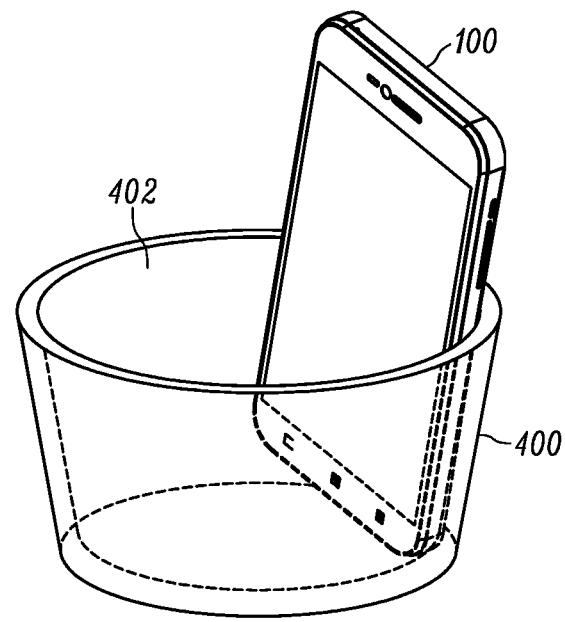
FIG. 4 is a perspective view of an exemplary portable electronic device in contact with an interior surface of a bowl type structure.

FIG. 4 illustrates a perspective view of an exemplary portable electronic device 100 in contact with an interior surface 402 of a bowl type structure 400. Similar to the substantially flat surface 300 of FIG. 3, the bowl type structure 400 including the interior surface 402 can be part of a wireless charging device, which also can have one or more coils, which are present just below the surface, and are intended to interact with the one or more coils of the portable electronic device 100. Any coils included as part of the interior surface 402 of the bowl type structure 400, which forms part of a wireless charging device can be constructed and arranged so as to facilitate an electromagnetic coupling with the one or more coils of the portable electronic device 100.

The interior curved surface 402 of the bowl type structure 400 can be structured so as to have coils which produce an electromagnetic field which are directed through the interior space within the bowl 400, where at least portions of one or more devices including any respective charging coils may be present. The location, as well as the relative spacing and orientation of the of the one or more coils of the portable electronic device with respect to the location and orientation of the one or more coils of the wireless charging device, can have an impact on the strength or degree of electromagnetic coupling, which in turn will impact the efficiency with which a signal present in the coils associated with one of the devices will be reflected in the coils associated with the other one of the devices.

Figure 5:
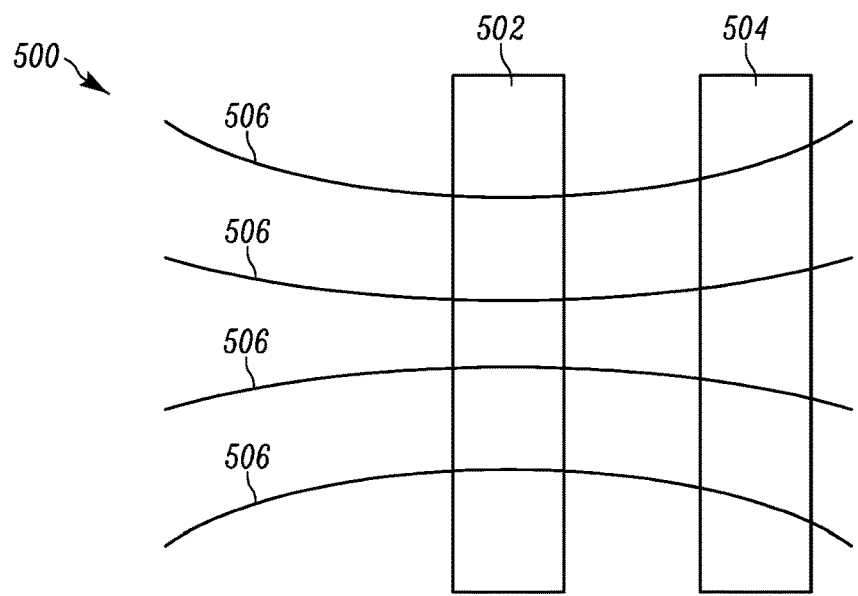
FIG. 5 is a block diagram illustrating a side view of a pair of conductive coils being brought within proximity to one another.

FIG. 5 is a block diagram 500 illustrating a side view of a pair of conductive coils 502 and 504 being brought within proximity to one another. In the illustrated embodiment, power is supplied to conductive coil 502, which in turn produces an electromagnetic field. Exemplary electromagnetic field lines 506 are shown emanating from conductive coil 502, where portions of at least some of the electromagnetic field lines intersect with the other conductive coil 504. In turn, the field lines being produced by the first one 502 of the two coils, which intersect with the other one 504 of the two coils, can be used to induce a voltage in the other one 504 of the two coils. The location and magnitude of the field strength, illustrated by the field lines 506 can be affected by the size and shape, as well as the number of loops, of the conductive coil 502 through which the power is supplied. Generally, the field extends in a direction that is perpendicular to the coil with the field strength decreasing as you get further away from the coil.

In the illustrated embodiment, the second coil 504 is relatively proximate the source coil 502. Furthermore, the arrangement of the second coil 504 is such, that the second coil 504 substantially overlaps the source coil 502. The orientation of the second coil is similar to the orientation of the source coil 502, such that the field lines produced by the source coil 502 intersect with the second coil 504 in a direction largely consistent with the direction in which the field was produced. Such an orientation and arrangement provides a relatively high degree of coupling, which is limited to the degree to which the two loops can be spaced proximate to one another.

Figure 6:
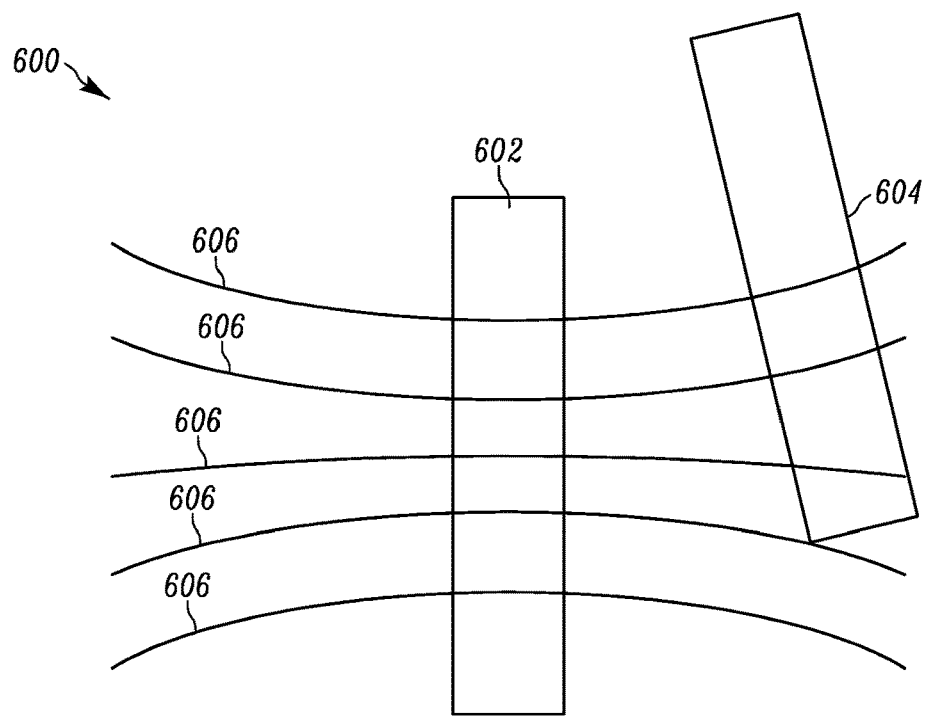
FIG. 6 is a further block diagram illustrating a side view of a pair of conductive coils being brought within proximity to one another.

FIG. 6 is a further block diagram 600 illustrating a side view of a pair of conductive coils 602 and 604 being brought within proximity to one another. In the illustrated embodiment, power is supplied to conductive coil 602, which in turn produces an electromagnetic field. Exemplary electromagnetic field lines 606 are shown emanating from conductive coil 602, where portions of at least some of the electromagnetic field lines intersect with the other conductive coil 604. In turn, the field lines being produced by the first one 602 of the two coils, which intersect with the other one 604 of the two coils, can be used to induce a voltage in the other one 604 of the two coils. Similarly, the location and magnitude of the field strength, illustrated by the field lines 606 can be affected by the size and shape, as well as the number of loops, of the conductive coil 602 through which the power is supplied, and the direction of the field lines relative to the receiving conductive coil 604.

The bowl shape has the potential to act like a convex mirror and focus electromagnetic fields being produced from multiple locations around the interior surface toward a same or similar spot within the interior of the bowl space. By controlling the phase of the signal sources one can adjust, somewhat, the point where the fields from multiple coils will constructively add. While the receiving conductive coil 604 intersects only a subset of the electromagnetic field lines 606, the orientation of the receiving conductive coil 604 receives those field lines proximate a perpendicular orientation, because the field lines 606 curve around and turn back proximate the edge of the coil 602.

One can adjust the degree of electromagnetic coupling by changing location and/or orientation of the receiving conductive coil 604 relative to the conductive coil 602 within which power is being supplied. Alternatively, the relative location and orientation, as well as the effective number of coils can be affected by adjusting the size and shape of one or more of the conductive coils. The size and shape of at least one of the coils could be affected by a mechanical adjuster. In addition to delivering and receiving power, the electromagnetic coupling could additionally and/or alternatively be used to facilitate a coupling which allows for communication data signals to be exchanged.

Figure 7:
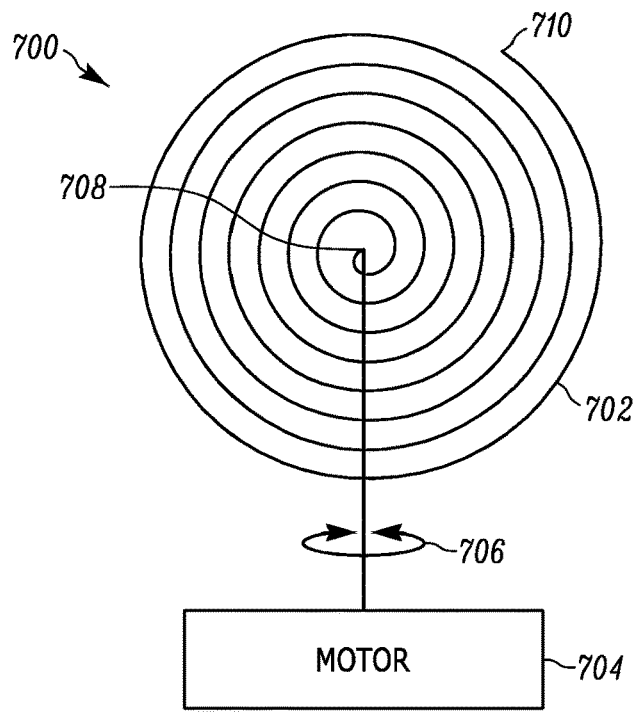
FIG. 7 is a schematic view of an exemplary coil and mechanical adjuster in the form of a motor for applying a rotational force to an end of the coil.

FIG. 7 illustrates a schematic view 700 of an exemplary coil 702 and mechanical adjuster in the form of a motor 704 for applying a rotational force 706 to an end 708 of the coil 702. In at least some instances, the coil will generally be comprised of a coil structure that is relatively free to move about. In some cases, the coil may rest upon a support surface like a substrate, but may have portions that are not fixed relative to the substrate. However, one or more points along the length of the coil may be fixed relative to the substrate. One such point may be an end 710 of the coil. The other end 708 could be attached to a mechanical adjustor, such as a motor 704.

In the illustrated embodiment, the one or more loops of the coil 702 are arranged in a generally spiral configuration, where a rotational force applied to the end 708 of the coil, while the other end 710 is fixed, can cause one or more additional loops to form, while the circumference of some of the pre-existing loops are caused to tighten inward. The additional loops, can serve to increase the strength of an electromagnetic field that might be produced. Further, the shrinking of one or more loops can also have the effect of focusing the electromagnetic field being produced into a more restricted space, which can impact the ability of another nearby coil to interact with the electromagnetic field.

The coil 702 is generally formed from a conductive material such as a metal material, through which a current can be induced and/or conveyed. The coil 702 will have a rest shape, that can have a varying degree of resistance to a change of its shape. The resistance in change could manifest in the structure storing a spring like energy as it is caused to deviate from its preadjusted rest shape or structure, such that when the applied force is removed and/or relaxed, the coil 702 will attempt to return at least partially to its original rest size and shape. While the motor 704 could serve to tighten the coil 702 into additional loops, it is also possible that the motor 704 could alternatively seek to expand and reduce the number of loops in the coil 702 by turning and applying rotational force to end 708 having an opposite direction.

It is further possible that the coil could be formed from a shape memory material, such as a shape memory alloy or polymer, that could be selectively adjusted to transition between two different shapes or structures dependent upon the presence, absence, or different amounts of an externally applied trigger stimulus. Such a transition between multiple shapes could be affected through a change in temperature, a flow of an electric current, or other type of trigger. Such an effect could supplement or replace the type of movement that might be externally induced, such as from the motor 704 and/or other mechanical adjustor. In at least some instances, the motor 704 will be a flat motor, which may make it easier to include the motor within various different sized shapes and/or constrained spaces. In addition to and/or alternative to a motor, a linear actuator could be used to affect the size and shape of one or more loops of a coil.

Figure 8:
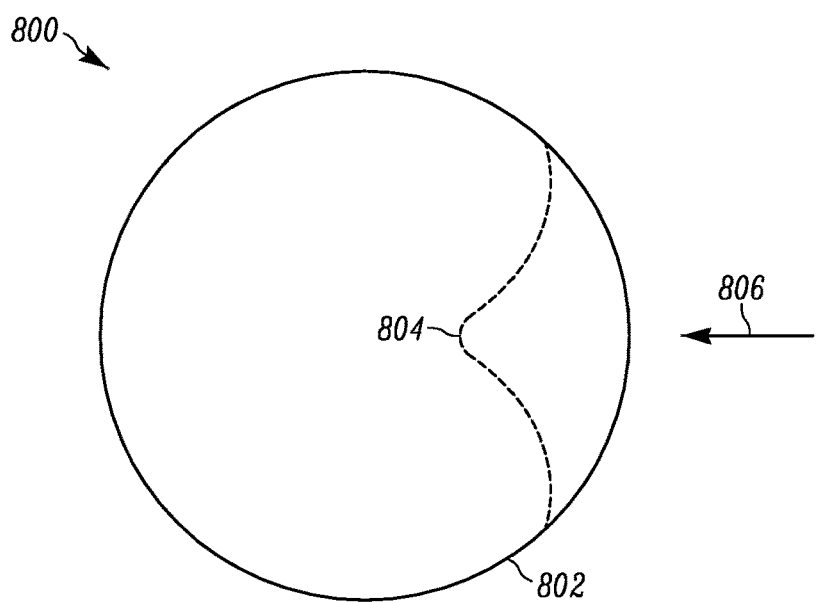
FIG. 8 is an overlay view of the outer circumference of an exemplary coil and the exemplary effect on the outer circumference in the form of an inward deflection when an inward force is applied to a point along the outer circumference.

FIG. 8 illustrates an overlay view 800 of the outer circumference 802 of an exemplary coil and the exemplary effect on the outer circumference 802 in the form of an inward deflection 804 when an inward force 806 is applied to a point along the outer circumference 802. The inward deflection 804 serves to affect the overall shape and/or size of at least one or more loops of the coil. By adjusting the size and/or shape of one or more loops, the electromagnetic coupling as part of creation or receipt of an electromagnetic field in the respective coils, can be affected.

Figure 9:
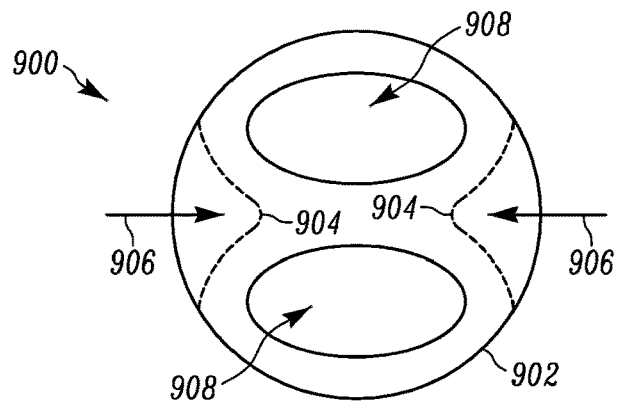
FIG. 9 is an overlay view of the outer circumference of an exemplary coil and the exemplary effect on the outer circumference in the form of inward deflections when a pair of inward forces are applied to respective points along the outer circumference.

FIG. 9 illustrates an overlay view 900 of the outer circumference 902 of an exemplary coil and the exemplary effect on the outer circumference 902 in the form of inward deflections 904 when a pair of inward forces 906 are applied to respective points along the outer circumference 902. As the pair of inward forces 906 are applied and the outer circumference 902 is affected, a couple of areas of concentration 908 begin to emerge, which can be used to affect the interaction of the electromagnetic field being produced with the one or more other coils, which are positioned to receive and react to the electromagnetic field being produced.

Figure 10:
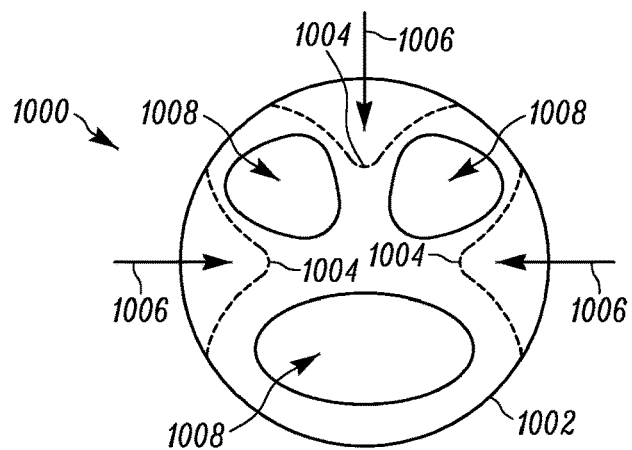
FIG. 10 is an overlay view of the outer circumference of an exemplary coil and the exemplary effect on the outer circumference in the form of inward deflections when a set of three inward forces are applied to respective points along the outer circumference.

FIG. 10 illustrates an overlay view 1000 of the outer circumference 1002 of an exemplary coil and the exemplary effect on the outer circumference 1002 in the form of inward deflections 1004 when a set of three inward forces 1006 are applied to respective points along the outer circumference 1002. FIG. 10 illustrates how the three inward forces 1006 can be used to begin to produce three areas of concentration 1008 of the electromagnetic field which can be produced.

Figure 11:
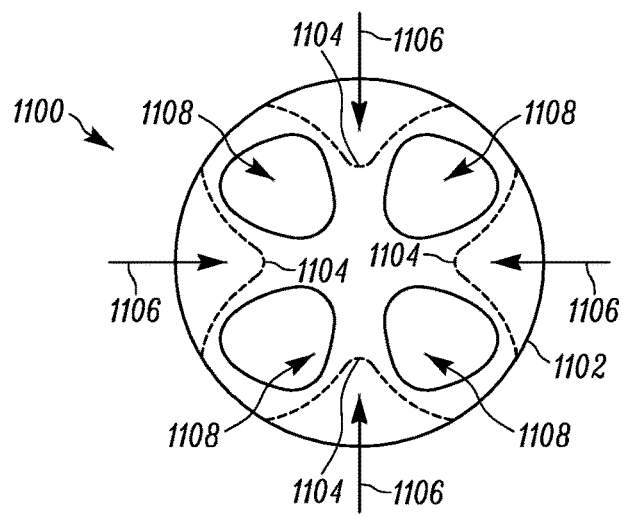
FIG. 11 is an overlay view of the outer circumference of an exemplary coil and the exemplary effect on the outer circumference in the form of inward deflections when a set of four inward forces are applied to respective points along the outer circumference.

FIG. 11 illustrates an overlay view 1100 of the outer circumference 1102 of an exemplary coil and the exemplary effect on the outer circumference 1102 in the form of inward deflections 1104 when a set of four inward forces 1106 are applied to respective points along the outer circumference 1102. FIG. 11 illustrates how the four inward forces 1106 can be used to begin to produce four areas of concentration 1108 of the electromagnetic field which can be produced.

Figure 13:
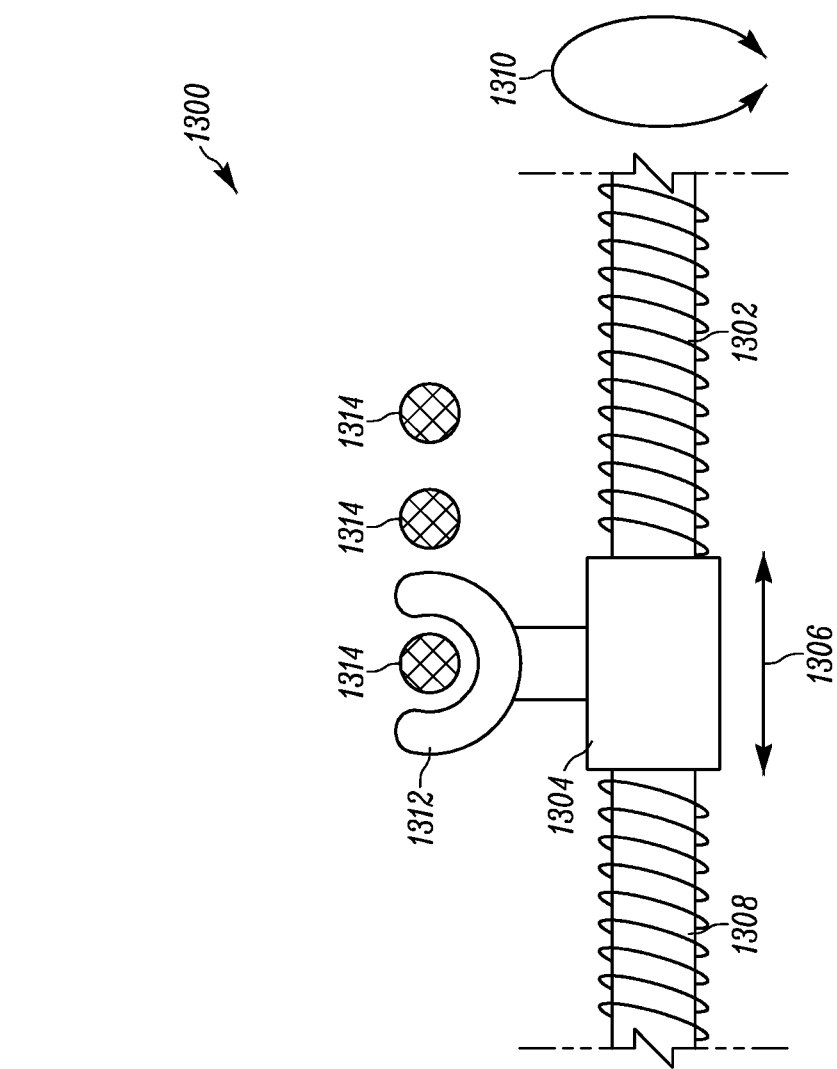
FIG. 13 is a partial sectional side view of a linear actuator for applying an inward force to a point on at least one of the loops of a coil.
Figure 12:
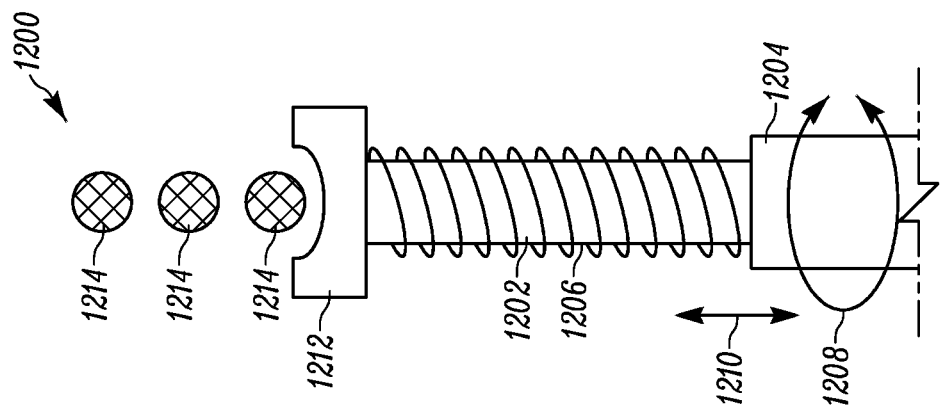
FIG. 12 is a partial sectional side view of a linear actuator for applying an inward force to a point on at least one of the loops of a coil.

While in each of FIGS. 8-11, the shape adjusting element is illustrated as an externally applied force, in at least some instances an externally applied force could be produced by one or more linear actuators. A couple of exemplary linear actuators are illustrated in FIGS. 12 and 13, and while each of these involves a conversion of a rotational movement to a linear movement using a threaded fastener, such as a screw, along which an element having internal threads, such as a nut, can move, other types of linear actuators, as well as other ways to apply a shape deforming force are possible without departing from the teachings of the present application. For example, additional forms of linear actuators can include the use of a wheel and axle, such as a hoist or winch; a cam actuator; a hydraulic actuator; a pneumatic actuator; and a piezoelectric actuator.

FIG. 12 illustrates a partial sectional side view 1200 of a linear actuator 1202 for applying an inward force to a point on at least one of the loops of a coil. More specifically, a base 1204 having internal thread could be adapted for receiving a threaded shaft 1206, which as the base 1204 is rotated 1208, causes the shaft 1206 to move into and out of 1210 the base 1204 depending upon the direction of rotation. The end of the shaft 1206 could have a contoured end cap 1212, which is adapted to engage the coil at a point along the outer circumference of at least one of the loops. In the partial sectional side view 1200, the cross section 1214 of three concentric loops are illustrated. By engaging at least one of the loops and applying a linear force, the size and/or shape of a corresponding loop, as well as other nearby loops may be affected. As the shape of a loop is affected, an immediately adjacent loop may similarly be affected, if during the deformation of the loop that is directly affected, the directly affected loop is caused to intersect and/or engage a further loop. The affect on this further loop could similarly cause a still further loop to be affected.

In order to avoid a potential shorting between loops from a cascading effect where a deformation to a first loop can have an effect on another loop, the loops may have one or more coatings in the area(s) that are likely to come into contact with another loop and/or the source of the applied force. For example, a non-conductive coating at the point of contact can help reduce the transmission of an electrical current between loops proximate the point of contact. Furthermore, the loops may further include a low friction material, which might better enable the multiple loops to slide relative to one another, when and if they come into contact with one another and/or if they come into contact with another structure. Example of a low friction material could include nylon or Teflon®.

FIG. 13 illustrates a partial sectional side view 1300 of a further linear actuator 1302 for applying an inward force to a point on at least one of the loops 1314 of a coil. The linear actuator includes a base 1304 including internal threads, which rides linearly along 1306 a threaded shaft 1308 as the threaded shaft rotates 1310. A contoured engagement point 1312 coupled to the base 1304 facilitates biasing one or more loops 1314 of a coil in a linear direction by engaging at least one of the loops, while the threaded shaft rotates 1310 and the base 1304 moves along 1306 the threaded shaft 1308.

While in at least some instances, the coil will be generally comprised of a coil structure that is relatively free to move about in order for the one or more loops which are adjustable to be able to change size and shape, in some instances the coil will be present in a constrained space or void, which provides some limit to the coil and correspondingly the loops overall movement. FIG. 14 illustrates a partial sectional side view 1400 of a plurality of loops 1402 of a coil positioned within a void 1404. In the illustrated embodiment, the void 1404 is a space having a floor 1406, i.e. a substantially planar surface, upon which at least portions of the coil are free to have some degree of movement. In addition to having a floor 1406, the void 1404 has a ceiling 1408. At least one end of the void 1404 has a closed end 1410, which limits the ability of the coil to extend in a direction toward the closed end 1410. As such, any expansion 1414 in the overall size of one or more loops of the coil is guided by the void 1404 toward the open end 1412, and away from expanding toward the closed end 1410. In some instances there may be no open end. In such an instance, the void may have an outer circumference which is substantially circular, and which restricts an ability of an outermost loop of the coil to expand.

FIG. 15 illustrates a partial sectional side view 1500 of a plurality of loops 1502 of a coil positioned within a curved void 1504. In at least some instances, the curved void 1504 could be associated with the bowl like charging structure 400 illustrated in FIG. 4. In the illustrated embodiment, the curved void 1504 within which the coil is located has both a curved floor 1506 and a curved ceiling 1508. In such an instance, the void 1504 can guide portions of the coil, as the one or more loops 1502, which are adjustable, are adapted to change size and shape. In the illustrated embodiment, the floor 1506 or the base of the void 1504 upon which the coil is adapted to rest curves upward further out from a center of the void 1504. As the loops 1502 of the coil expand 1510, the expanding portions of the coil are redirected by the floor 1506 of the void 1504 in an upward direction.

Figure 16:
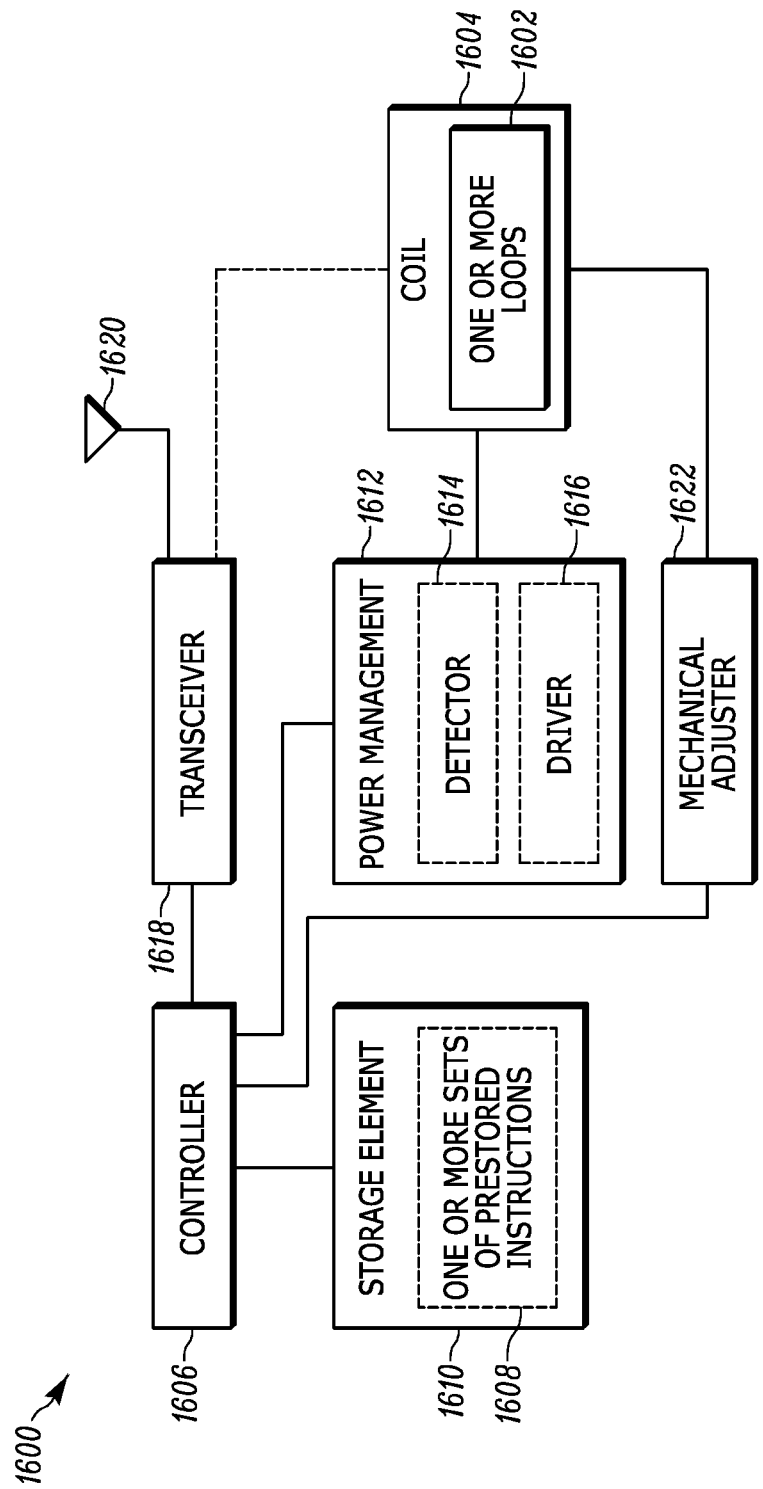
FIG. 16 is a block diagram of control circuitry for managing the size and shape of one or more adjustable loops of a coil.

FIG. 16 illustrates a block diagram of control circuitry 1600 for managing the size and shape of one or more adjustable loops 1602 of a coil 1604, in accordance with at least one embodiment. In the illustrated embodiment, the control circuitry 1600 includes a controller 1606, which is adapted for managing at least some of the operation of the coil 1604. In some embodiments, the controller 1606 could be implemented in the form of one or more processors, which are adapted to execute one or more sets of pre-stored instructions 1608, which may be used to form or implement the operation of at least part of one or more controller modules including those used to manage the adjustment of the one or more loops of the coil. The one or more sets of pre-stored instructions 1608 may be stored in a storage element 1610, which while shown as being separate from and coupled to the controller 1606, may additionally or alternatively include some data storage capability for storing at least some of the prestored instructions 1608 for use with the controller 1606, that is integrated as part of the controller 1606.

The storage element 1610 could include one or more forms of volatile and/or non-volatile memory, including conventional ROM, EPROM, RAM, or EEPROM. The possible additional data storage capabilities may also include one or more forms of auxiliary storage, which is either fixed or removable, such as a hard drive, a floppy drive, or a memory stick. One skilled in the art will still further appreciate that still other further forms of storage elements could be used without departing from the teachings of the present disclosure. In the same or other instances, the controller 1606 may additionally or alternatively incorporate state machines and/or logic circuitry, which can be used to implement at least partially, some of the modules and/or functionality associated with the controller 1606.

The control circuitry 1600 additionally includes power management circuitry 1612, which can include a detector 1614, and/or driver circuitry 1616. Driver circuitry 1616 can include conditioning and/or power amplification circuitry for supplying power to the coil. The detector 1614 can be used to monitor the current and/or the voltage being supplied to the coil, which in turn would allow the control circuitry 1600 an ability to monitor an effective impedance of the coil, as well as the amount of power being supplied to the coil.

The control circuitry 1600 can additionally include a transceiver 1618, which can be used to facilitate the control circuitry communicating with an external entity, such as another device that might be electromagnetically coupled to control circuitry via the coil. In some instances, the transceiver 1618 may communicate via the coil 1604 in which a communication signal is detected through an electromagnetic coupling via the coil 1604. In other instances, the transceiver 1618 may communicate with an external entity using an antenna 1620, which could be coupled to the transceiver 1618, via which wireless communication signals could be radiated and received using one or more communication protocols, such as Bluetooth® type communications and/or Wi-Fi® type communications. Other forms of communication are additionally and/or alternatively possible.

Through a communication with an external entity, such as an entity that might be making a connection through an electromagnetic coupling with the coil for receiving a wireless charge, the controller 1606 can receive feedback from the electromagnetically coupled device as to the status of the charging. For example, the controller 1606 could receive an indication of the amount of power being received through the electromagnetic coupling, which in turn could be compared with the amount of power being supplied. This would then allow the controller 1606 to determine whether changes being made relative to the wireless charging was having an effect on the electromagnetic coupling, as well as the ability of the coupling to supply a charge.

The controller 1606 could then use this information to make adjustments to one or more loops 1602 of the coil 1604 and determine whether the degree of coupling, corresponding to the efficiency of power transfer has been improved. The adjustments could be made by a mechanical adjuster 1622, such as a linear actuator, which could physically supply a mechanical force to the coil 1604. Alternatively, an adjustment could be made through an alternative interaction, including the application of a triggering condition in instances where the coil 1604 is formed using a shape memory material.

After a change has been affected in one or more loops 1602 of the coil 1604, such as one that affects size and/or shape of the one or more loops 1602, the controller 1606 can then compare an amount of power being received with the amount of power being supplied via the electromagnetic coupling. The controller 1606 can then determine if the most recent changes have resulted in an improvement and should be retained, or whether the most recent changes decreased the degree of electromagnetic coupling suggesting that the changes should be backed out, and the configuration of the one or more loops 1602 should revert back to before the most recent changes were applied. The controller 1606 can then attempt to make further changes, and further types of changes until the controller is satisfied with the current degree of electromagnetic coupling.

In addition to providing feedback as to the current status of charging, the external device could also supply via the transceiver 1618 known statistics related to the types of wireless charging supported by the external entity, as well as the specification of any and all coils including size and shape used to support wireless charging. This information could then be used by the controller 1606 as part of its adjustment of its coil 1604, and could present an opportunity whereby the fine tuning of the adjustment for increasing the degree of electromagnetic coupling could be accelerated.

In at least some instances, a controller 1606 could concurrently manage a degree of electromagnetic coupling relative to more than one other external entity. In such an instance, it may be possible that an attempted change in the size and shape of one or more loops 1602 of the coil 1604 relative to a particular one of the external entities may cause a degradation in the degree of electromagnetic coupling, but that taking into account all of the external entities that are currently electromagnetically coupled, the attempted change may be an improvement, overall, and one for which it would be desirable to retain the most recent change. Presumably, the controller 1606 would be able to communicate with and get feedback as to the amount of power being received relative to a particular attempted change from each of the external entities of interest, either directly or indirectly.

While the coil having one or more adjustable loops has been described as being part of a device that might be supplying a charge in support of wireless charging via an electromagnetic coupling, it is also possible that the coil having one or more adjustable loops could additionally or alternatively be incorporated in a device that is intended to receive power through an electromagnetic coupling. In instances, where both the device to be charged as well as the device supplying the charge have an adjustable coil, there may be protocol which manages which ones of the coils are allowed to be adjusted at any particular time.

Figure 17:
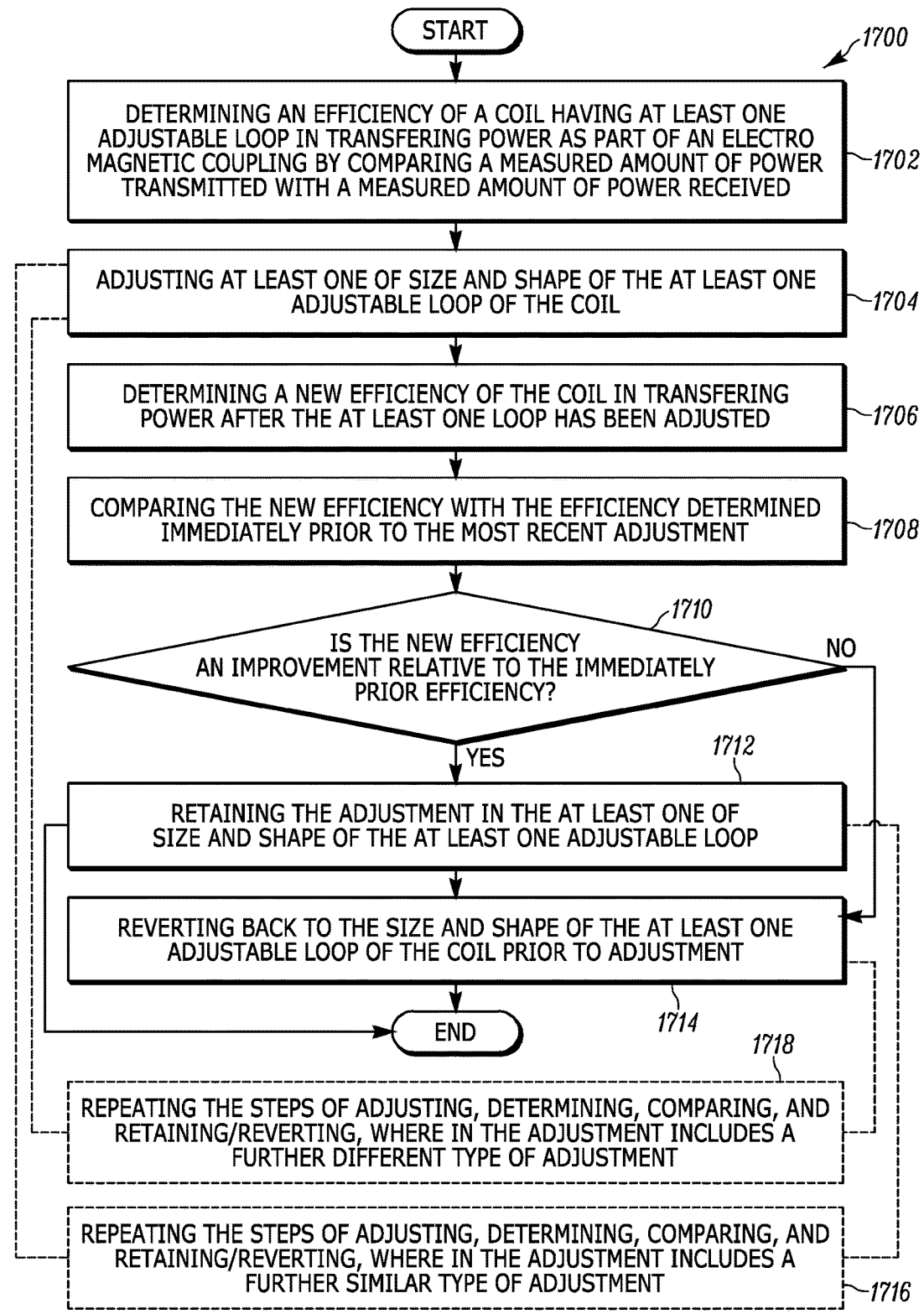
FIG. 17 is a flow diagram of a method for increasing the degree of an electromagnetic coupling.

FIG. 17 illustrates a flow diagram 1700 of a method for increasing the degree of an electromagnetic coupling. The method includes determining 1702 an efficiency of the coil having the at least one adjustable loop in transferring power as part of an electromagnetic coupling by comparing a measured amount of power transmitted in a first coil of the at least a pair of distinct coils with a measured amount of power received in at least a second coil of the at least a pair of distinct coils. At least one of size and shape of the at least one adjustable loop of the coil is then adjusted 1704. A new efficiency of the coil in conveying power between electromagnetically coupled coils after the at least one of size and shape of the at least one adjustable loop has been adjusted is then determined 1706. The new efficiency is then compared 1708 with the efficiency determined immediately prior to the most recent adjustment. The adjustment in the at least one of size and shape of the at least one adjustable loop is retained 1712, when the new efficiency is determined 1710 to be an improvement relative to the efficiency (i.e. degree of coupling) determined immediately prior to the most recent adjustment. Otherwise, the size and shape of the at least one adjustable loop of the coil is reverted back 1714 to the size and shape prior to adjustment, when the new efficiency is determined 1710 to not be an improvement relative to the efficiency determined immediately prior to the most recent adjustment.

In at least some instances, the method 1700 can further include repeating 1716 the steps of adjusting 1704, determining 1706, comparing 1708 and retaining 1712/reverting 1714, wherein the adjustment includes a further similar type of adjustment, when the immediately prior adjustment was determined to have resulted in an overall improvement in the degree of coupling.

In at least some instances, the method 1700 can further include repeating 1718 the steps of adjusting 1704, determining 1706, comparing 1708 and retaining 1712/reverting 1714, wherein the adjustment includes a further different type of adjustment, when the immediately prior adjustment was determined to not have resulted in an overall improvement in the degree of coupling.

While the preferred embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A coil for facilitating an electromagnetic coupling, said coil comprising:
   one or more loops formed from an electrically conductive material having a length; and
   a mechanical adjuster for applying a force to the coil at one or more points along the length of the electrically conductive material forming the one or more loops of the coil; and
   wherein the coil has at least two operational states, where between each of the at least two operational states at least one of the one or more loops has been adjusted through an application of force by the mechanical adjuster, so as to include a difference in at least one of a size and a shape of the at least one of the one or more loops in a respective plane of the corresponding loop.

2. The coil in accordance with claim 1, wherein the coil is coupled to a substrate at one or more points along a length of the coil, and the coil includes one or more sections forming one or more loops that are not coupled to the substrate.

3. The coil in accordance with claim 1, wherein the one or more loops are arranged to form a plurality of concentric loops, wherein each respective end of each of the one or more loops is coupled to a respective one of a preceding loop and a subsequent loop from the one or more loops, with the exception of an innermost loop and an outermost loop, which are each coupled to another loop from the one or more loops at only one end.

4. The coil in accordance with claim 1, wherein the mechanical adjustor includes a motor which is adapted for applying a rotational force to an end of the coil.

5. The coil in accordance with claim 4, wherein the motor applies a rotational force to an end of an innermost loop in a coil including one or more concentric loops.

6. The coil in accordance with claim 1, wherein the mechanical adjustor applies an inward force to one or more points along an outer circumference of the coil, wherein a shape of the coil is deflected inward proximate each of the points the force is applied.

7. The coil in accordance with claim 6, wherein the mechanical adjustor applying the inward force includes one or more linear actuators.

8. The coil in accordance with claim 6, wherein the inward deflection of the shape of the coil proximate each of the points the force is applied causes the shape of the coil to form one or more sub-loops.

9. The coil in accordance with claim 1, wherein the coil is located in an otherwise empty space.

10. The coil in accordance with claim 9, wherein the otherwise empty space within which the coil is located has an outer circumference which is substantially circular, which restricts an ability of an outermost loop of the coil to expand.

11. The coil in accordance with claim 9, wherein a base of the otherwise empty space upon which the coil is adapted to rest curves upward further out from a center of the otherwise empty space, wherein as the loops of the coil expand the expanding portions of the coil are redirected by the base of the otherwise empty space in an upward direction.

12. The coil in accordance with claim 1, wherein the coil is part of a coil assembly, and the electrically conductive material, is at least partially encased in a low electrically conductive material.

13. The coil in accordance with claim 1, wherein the coil is part of a coil assembly, and the electrically conductive material, is at least partially encased in a low friction material.

14. The coil in accordance with claim 1, wherein at least one or more portions of the coil is formed from a shape-memory material, which is adapted to change shape based upon an externally applied stimulus being applied to the respective portions of the coil.

15. The coil in accordance with claim 14, wherein the externally applied stimulus includes a change in temperature.

16. The coil in accordance with claim 1, which is incorporated as part of a wireless charging device.

* * * * *